US011648993B2

(12) United States Patent
Gase et al.

(10) Patent No.: US 11,648,993 B2
(45) Date of Patent: May 16, 2023

(54) AUTOMOTIVE VEHICLE WITH TELESCOPING TAILGATE

(71) Applicant: Rivian IP Holdings, LLC, Plymouth, MI (US)

(72) Inventors: Brian Gase, Ypsilanti, MI (US); Patrick Hunt, Evanston, IL (US); Kyle Mulligan, Livonia, MI (US); Larry Parker, Bloomfield Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 231 days.

(21) Appl. No.: 16/917,057

(22) Filed: Jun. 30, 2020

(65) Prior Publication Data
US 2021/0403097 A1    Dec. 30, 2021

(51) Int. Cl.
*B62D 33/027* (2006.01)
*E05F 15/605* (2015.01)

(52) U.S. Cl.
CPC ..... *B62D 33/0273* (2013.01); *B62D 33/0276* (2013.01); *E05F 15/605* (2015.01); *E05Y 2900/546* (2013.01)

(58) Field of Classification Search
CPC ............. B62D 33/0273; B62D 33/0276; E05F 15/605; E05Y 2900/546; B60R 3/02
See application file for complete search history.

(56) References Cited

U.S. PATENT DOCUMENTS

| 6,991,277 B1 * | 1/2006 | Esler | B60P 3/14 296/50 |
| 11,208,157 B2 * | 12/2021 | Borkar | B62D 33/037 |

\* cited by examiner

*Primary Examiner* — D Glenn Dayoan
*Assistant Examiner* — Melissa Ann Bonifazi
(74) *Attorney, Agent, or Firm* — Clements Bernard Walker; Christopher L. Bernard (57) ABSTRACT

Various disclosed embodiments include illustrative telescoping tailgate systems for an automotive vehicle and illustrative automotive vehicles with a telescoping tailgate system for carrying cargo or passengers. In an illustrative embodiment, a telescoping tailgate system for an automotive vehicle includes: a primary tailgate configured to be movably attached to a body of an automotive vehicle, the primary tailgate defining an opening therethrough; a secondary tailgate movably attached to the primary tailgate; and a telescoping mechanism configured to move the secondary tailgate between a retracted position and an extended position, the secondary tailgate being configured to close the opening in the primary tailgate when the secondary tailgate is in an extended position.

18 Claims, 6 Drawing Sheets

AUTOMOTIVE VEHICLE WITH TELESCOPING TAILGATE

INTRODUCTION

The present disclosure relates to tailgates for automotive vehicles, including electric vehicles, hybrid vehicles, and autonomous vehicles.

The statements in this section merely provide background information related to the present disclosure and may not constitute prior art.

Automotive vehicles typically have a storage area located in the rear of the vehicle. Some types of automotive vehicles, including trucks, may have an open storage area, referred to as a storage bed or a bed. In such vehicles, access to the bed is provided via a tailgate located at a rear portion of the bed, wherein the tailgate may be latched in a closed, upright position or unlatched in an open, horizontal position. A tailgate is connected to the vehicle by hinges at opposing sides of the base of the tailgate to allow opening and closing.

A traditional tailgate may act as an obstacle to access the bed when closed (as presenting a wall obstacle) and when open (as protruding outward from the bed and further separating a user from an inner portion of the bed). The problem may be exacerbated when a bed has an integrated bed cover. When a bed cover is present, a user typically must open the cover before opening the tailgate.

BRIEF SUMMARY

Various disclosed embodiments include illustrative telescoping tailgate systems for an automotive vehicle and illustrative automotive vehicles with a telescoping tailgate system for carrying cargo or passengers.

In an illustrative embodiment, a telescoping tailgate system for an automotive vehicle includes: a primary tailgate configured to be movably attached to a body of an automotive vehicle, the primary tailgate defining an opening therethrough; a secondary tailgate movably attached to the primary tailgate; and a telescoping mechanism configured to move the secondary tailgate between a retracted position and an extended position, the secondary tailgate being configured to close the opening in the primary tailgate when the secondary tailgate is in an extended position.

In another illustrative embodiment, an automotive vehicle with a telescoping tailgate system for carrying cargo or passengers includes: a vehicle body; a primary tailgate movably attached to the vehicle body, the primary tailgate defining an opening therethrough; a secondary tailgate movably attached to the primary tailgate; and a telescoping mechanism configured to move the secondary tailgate between a retracted position and an extended position, the secondary tailgate being configured to close the opening in the main tailgate when the secondary tailgate is in an extended position.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Illustrative embodiments are illustrated in referenced figures of the drawings. It is intended that the embodiments and figures disclosed herein are to be considered illustrative rather than restrictive.

Like reference symbols in the various drawings indicate like elements.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative telescoping tailgate systems for an automotive vehicle and illustrative automotive vehicles with a telescoping tailgate system for carrying cargo or passengers.

FIGS. 1A-1D illustrate an example of an automotive vehicle 101 with a telescoping tailgate according to various embodiments. The automotive vehicle 101 has a front side 103, a rear side 105, a left side 107, and a right side 109. The automotive vehicle 101 may have a bed 111 including a bed surface 111a and bed walls 111b made of steel, high strength aluminum, carbon fiber composite, or other suitably strong material. The automotive vehicle 101 includes an illustrative telescoping tailgate 113 that includes a primary tailgate 116, an illustrative secondary tailgate 117, hinges 115 that rotatably attach the telescoping tailgate 113 to the vehicle 101, and a telescoping tailgate mechanism 112. The primary tailgate 116 is configured with an opening through the primary tailgate 116, and the secondary tailgate 117 may be controlled to move between an extended position and a retracted position (or to intermediate positions). In some such embodiments, the retracted position may help preserve the opening in the primary tailgate 116 and the extended position may help close the opening in the primary tailgate 116.

Figure 1A:
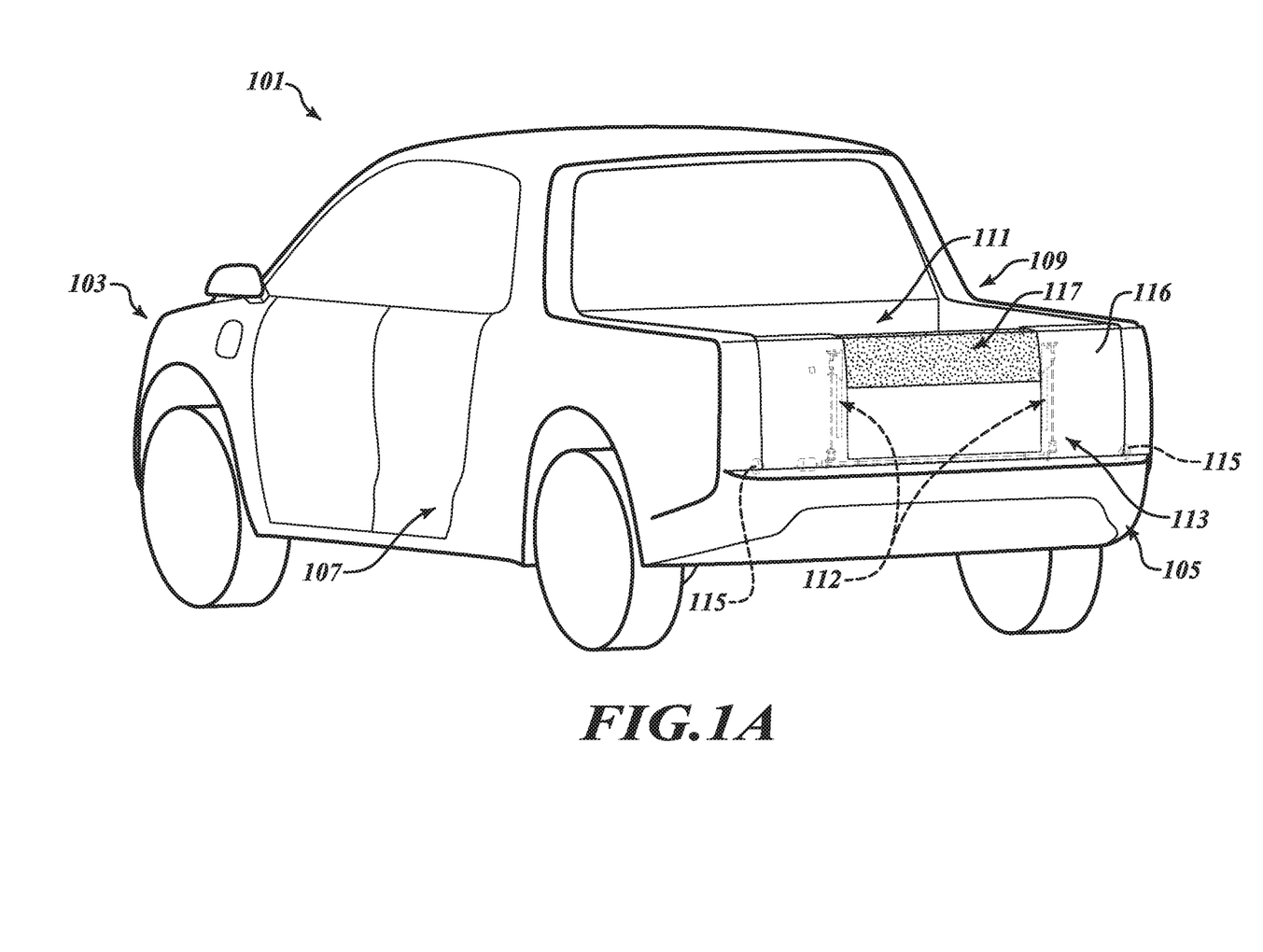
FIGS. 1A-1D are perspective views of an illustrative vehicle with a telescoping tailgate.
Figure 1B:
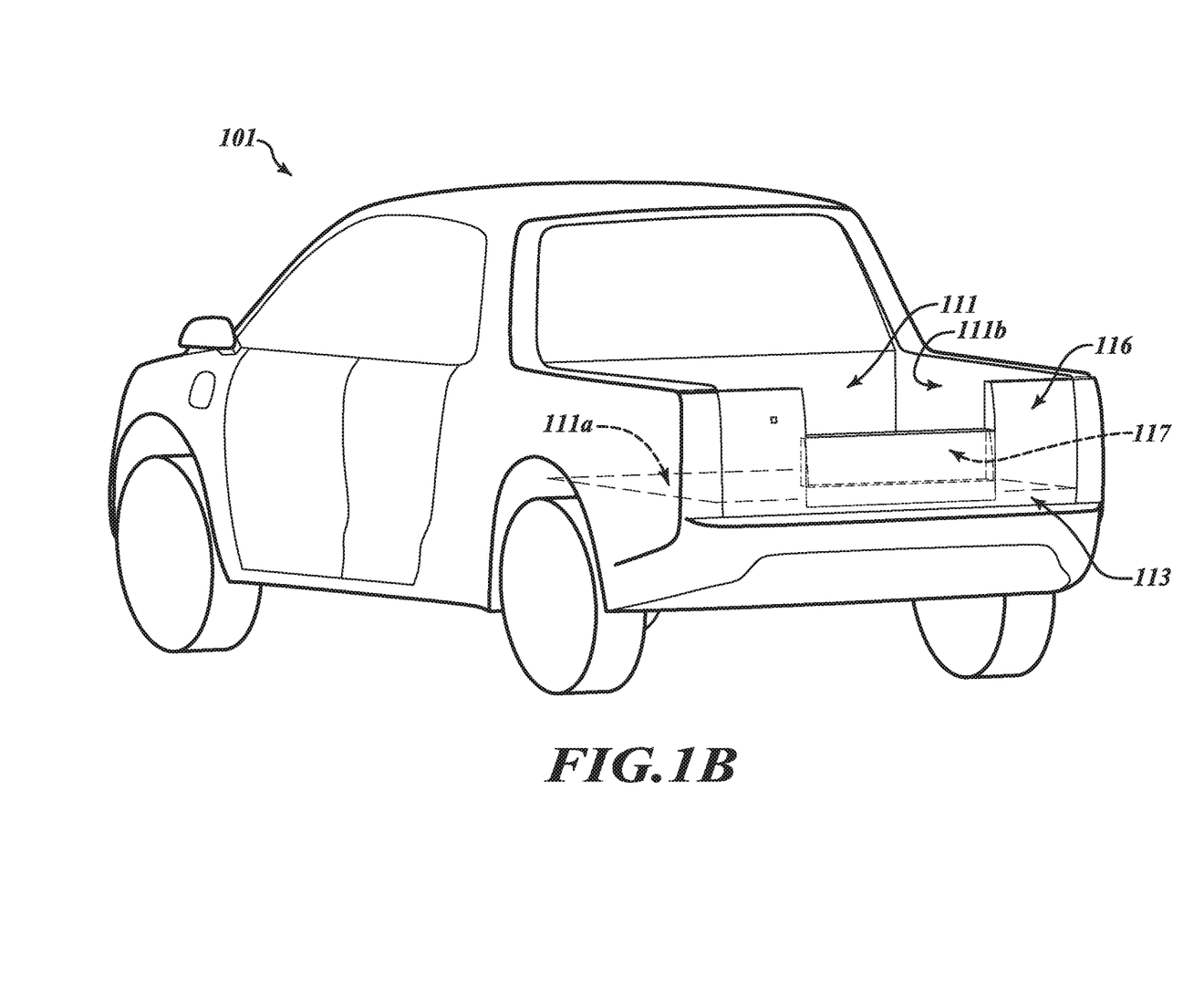

FIG. 1A shows the illustrative tailgate 113 in a closed position and the secondary tailgate 117 in an extended position. As shown in FIG. 1B, the tailgate 113 with a secondary tailgate 117 cooperates with bed walls 111b to enclose a storage area of the bed 111 of the vehicle 101. The tailgate 113 includes a latching mechanism (not shown), such as conventionally known, which secures the tailgate 113 to the bed walls 111b when in a closed position under control of a mechanical release lever 114 or other suitable mechanism, for example, an electromechanical latch mechanism known to those of skill in the art. The primary tailgate 116 and secondary tailgate 117 may be made of steel, high strength aluminum, carbon fiber composite, or other suitably strong material. The primary tailgate 116 is configured to be load-bearing—meaning that it is configured to support the weight of cargo and/or an adult human passenger/user. In addition, the secondary tailgate 117 may also be configured to be load-bearing. In various embodiments, the secondary tailgate 117 need not be made of window glass—which is not configured to be load-bearing to support the weight of cargo and/or an adult human.

FIG. 1B shows the illustrative tailgate 113 in a closed position and the secondary tailgate 117 in a retracted position. As shown in FIG. 1B, the secondary tailgate 117 has transitioned from an extended position in FIG. 1A to a retracted position in FIG. 1B by operating an illustrative telescoping mechanism described herein. In the position illustrated in FIG. 1B, the tailgate 113 cooperates with bed walls 111b to enclose a storage area of the bed 111 of the vehicle 101—but the secondary tailgate 117 in the retracted position allows limited access to bed 111 of the vehicle 101. The secondary tailgate 117 may be positioned at intermediate positions as well as in the extended and retracted positions.

Figure 1C:
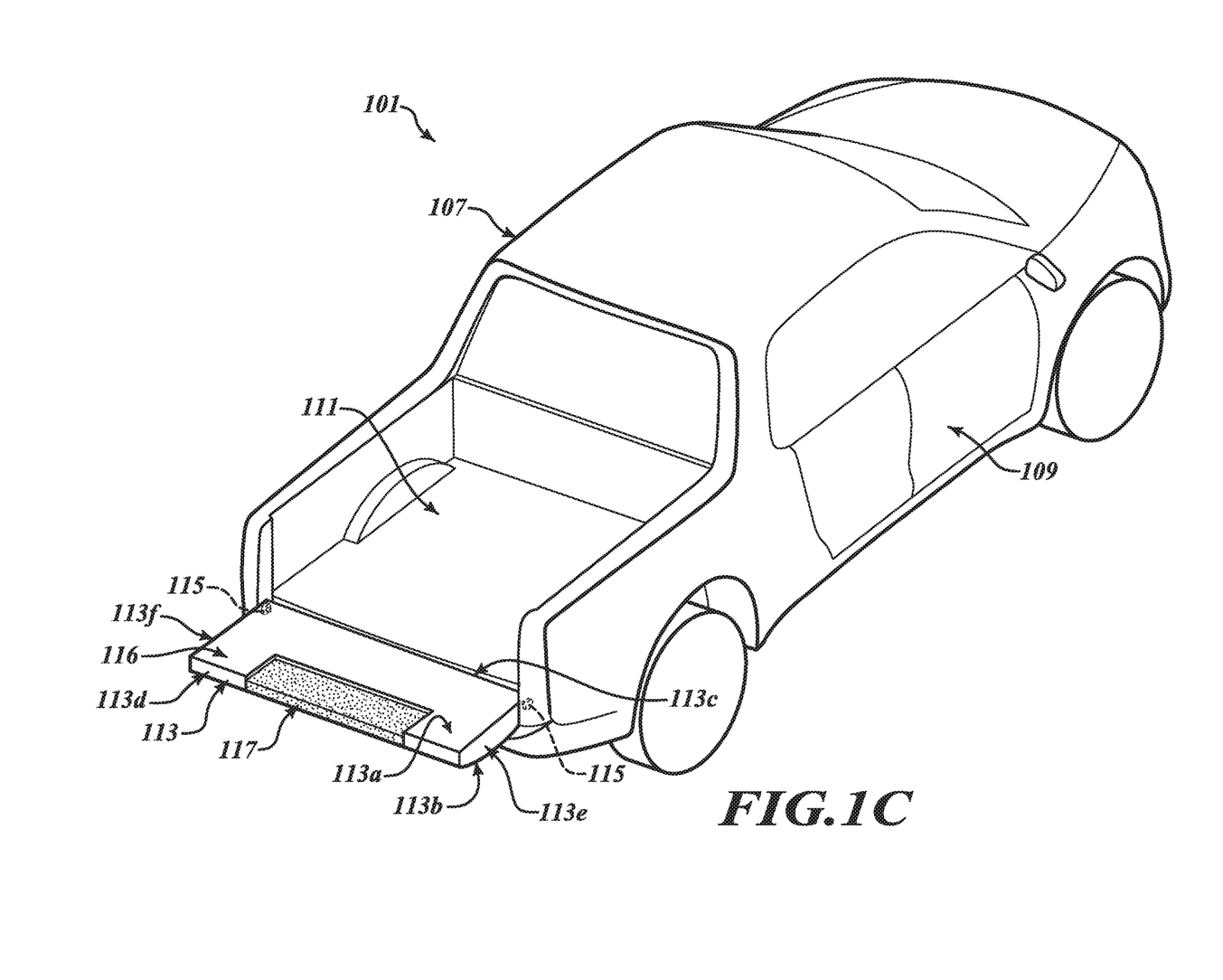

FIG. 1C shows the illustrative tailgate 113 in an open (horizontal) position, and the secondary tailgate in an extended position. In the depiction shown in FIG. 1C, the tailgate 113 has transitioned from the closed position of FIG. 1A to the open position of FIG. 1C by rotating the tailgate 113 about first and second primary hinges 115 at opposing bottom sides of the tailgate 113 which are attached to respective supporting portions of the vehicle bed walls 111b in such embodiments. Alternatively, the vehicle 101 may have one primary hinge 115 that spans a portion of a bottom edge of the tailgate 113 and is attached to a respective supporting portion of an edge of the bed surface 111a or several, for example, 3, 4 or 5 primary hinges 115 spanning a portion of a bottom edge of the tailgate 113. In the position depicted in FIG. 1C, the tailgate 113 with a secondary tailgate 117 may permit limited access to bed 111 of the vehicle 101. As shown in FIG. 1C, the tailgate 113 may include an inner panel 113a and an outer panel 113b, for example, welded together so as to include a bottom portion 113c, a top portion 113d, a first side portion 113e, and a second side portion 113f, such that the tailgate 113 is configured with a hollow interior that may house a telescoping mechanism (not shown in FIG. 1C) described herein.

Figure 1D:
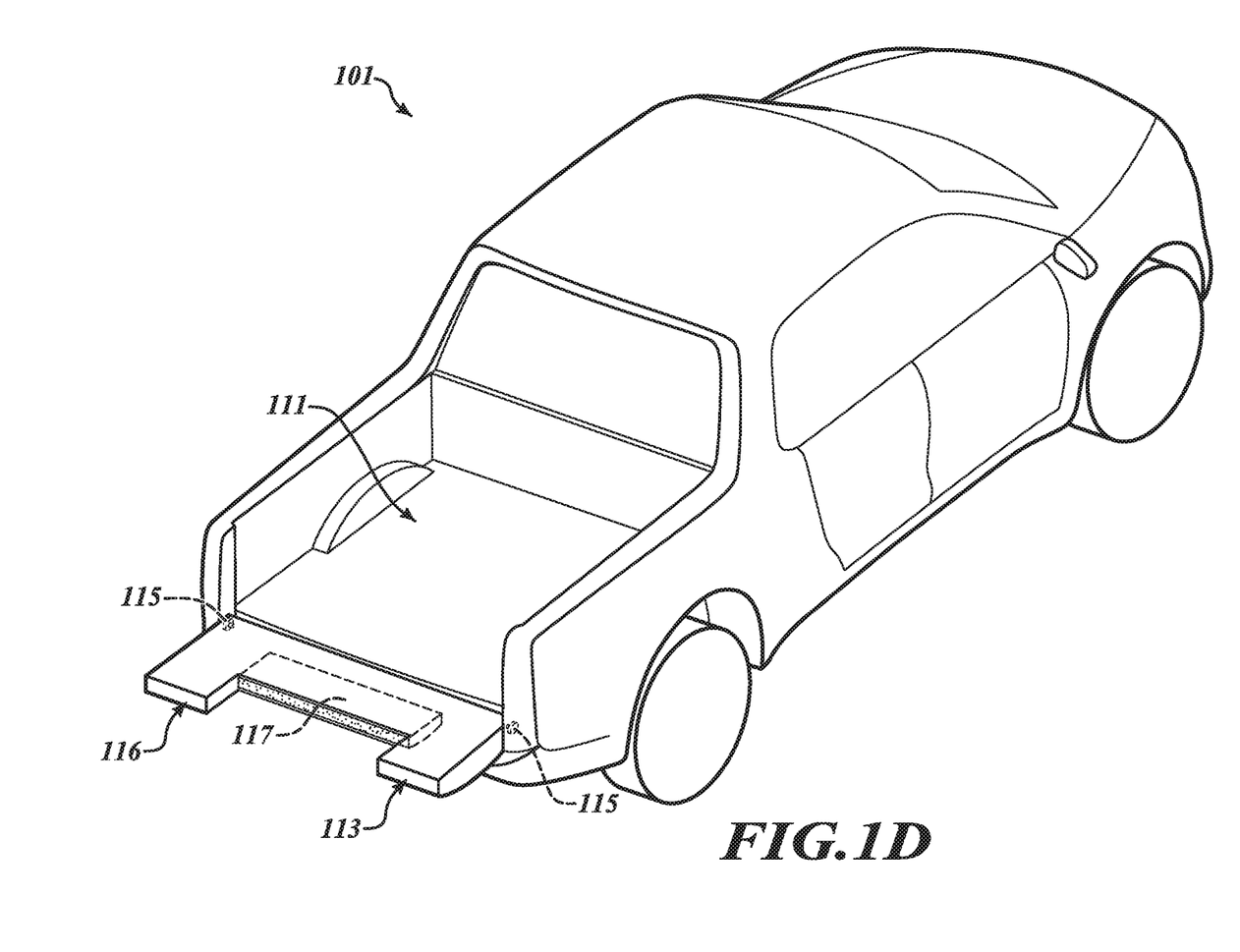

FIG. 1D shows the illustrative tailgate 113 in an open position and the secondary tailgate 117 in a retracted position. In the depiction shown in FIG. 1D, the secondary tailgate 117 has transitioned from the extended positioned in FIG. 1C to the retracted position in FIG. 1D via a telescoping mechanism described herein. In the position illustrated in FIG. 1D, the tailgate 113 may allow limited access to the bed 111 of the vehicle 101 and the secondary tailgate 117 may permit further access to the bed 111 of the vehicle 101, for example, by permitting a user to more closely approach the bed 111.

It will be appreciated that the terms upward, downward, up, down, top, and bottom are relative terms as used herein are not intended to be limiting. For example, the secondary tailgate 117 may be moved "upward" relative to other portions of the tailgate 113 to a fully "up" (closed) position even when the tailgate 113 is in an open, horizontal orientation. It can be further noted that access to storage located within or under the bed, such as a storage bin, is improved by this position of the tailgate.

It will be appreciated that the illustrative tailgate 113 may occupy any point between the positions in which the primary tailgate 116 is closed (as illustrated in FIGS. 1A and 1B) and the positions in which the primary tailgate 116 is open (as illustrated FIGS. 1C and 1D) while the secondary tailgate 117 may independently occupy any point between its extended positions shown in FIGS. 1A and 1C and its retracted positions shown in FIGS. 1B and 1D.

It will be appreciated that the sizes of the of the main tailgate 116, the opening defined therein, and the secondary tailgate 117 may vary depending upon the desired configuration and vehicle. In some examples, the primary tailgate 116 may have a width in the range of about 6 feet to about 8 feet, a height in the range of about 1 foot to about 2 feet, and a depth in the range of about 3 inches to about 6 inches. In some examples, the opening in the primary tailgate 116 may have a width in the range of about 2 feet to about four feet, a height of in the range of about 6 inches to about 12 inches, and a depth equal to that of the primary tailgate. In some examples, the secondary tailgate 117 may have a height and a width about the same size or slightly larger, for example, 1 or 2 inches larger, than those of the opening in the main tailgate 116, and a depth that is slightly smaller than that of the primary tailgate 116, for example, 0.5 to 2 inches smaller. Thus, in some examples, the secondary tailgate 117 may have a width in the range of about 2 feet to about four feet, a height of in the range of about 6 inches to about 12 inches, and a depth in the range of about 2 to 5 inches. It will be appreciated that the dimensions disclosed herein are merely illustrative and that other dimensions may be utilized.

Figure 2:
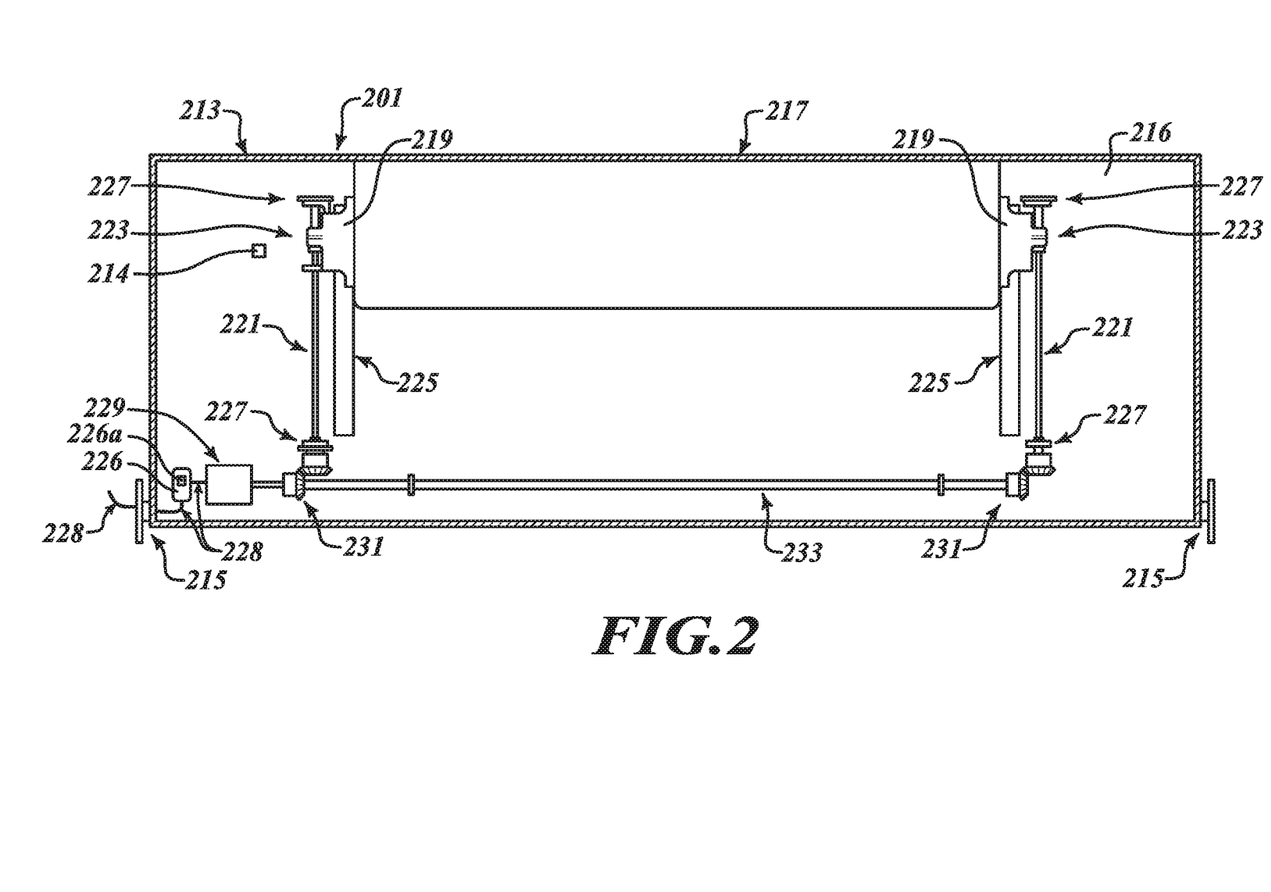
FIG. 2 is a plan view in partial cutaway of an illustrative telescoping tailgate mechanism.

FIG. 2 illustrates an illustrative telescoping mechanism 201 of a telescoping tailgate 213. In various embodiments the illustrative telescoping mechanism 201 may be disposed in an interior portion of the primary tailgate 213. In various embodiments the telescoping mechanism 201 may include multiple gate mounting brackets 219 attached to the secondary tailgate 217 and further attached to ball nuts 223, which are driven by ball screws 221 under the power of a motor 229 via a shaft 233 and gear boxes 231. Mounting brackets 219 ride along tracks 225 that are connected to the primary tailgate 216. In such embodiments, the ball screws 221 extend between bearings 227 supported by bearing housings attached to inner surfaces of the tailgate 213. In FIG. 2, two gate mounting brackets 219 are illustrated at opposing sides of the secondary tailgate 217. The mounting brackets 219 may be made of steel, high strength aluminum, carbon fiber composite, or other material of suitable strength. The mounting brackets 219 may be attached to the secondary tailgate 217 and to the ball nuts 223 using any suitable connection mechanism such as welds or fasteners such as screws, bolts, or rivets, or other suitable means. While two mounting brackets 219 are shown in FIG. 2, one at each of the opposing sides of the secondary tailgate 217, telescoping mechanism 201 may include a different number of mounting brackets 219 and a different number of ball nuts 223 located in different positions, for example, two or more mounting brackets 219 and associated ball nuts 223 located at each of the opposing sides of the secondary tailgate 217, thereby providing four or more mounting brackets 219 and four or more associated ball nuts 223 overall.

As shown in FIG. 2, two ball screws 221 and two ball nuts 223 may be utilized, one located at each of the opposing sides of the secondary tailgate 217, for driving the mounting brackets 219 and thereby driving the secondary tailgate 217 between retracted, extended, and intermediate positions along tracks 225. As shown in FIG. 2, the ball screws 221 may be oriented in a vertical orientation between a top edge and a bottom edge of the tailgate 213. Telescoping mechanism 201, however, may include a different number of ball nuts 223, for example, one, two, or more ball nuts 223 for each tailgate mounting bracket 219. As illustrated in FIG. 2, the ball screws 221 and the ball nuts 223 may come as matched ball screw/ball nut pairs. At least one of the ball screws 221 may be positioned between the secondary tailgate 217 and the left side of the vehicle (not shown), and at least one of the ball screws 221 may be positioned between the secondary tailgate 217 and the right side of the vehicle (not shown).

As illustrated in FIG. 2, the telescoping mechanism 201 may include tracks 225 attached to the primary tailgate 216, for example, one or more positioned at each of opposing right and left sides of the secondary tailgate 217 to guide the motion of the brackets 219 attached to the secondary tailgate 217. The illustrative tracks 225 may be sealed to prevent dust, liquids, and other contamination from degrading performance of the tailgate 213. The tracks 225 may guide the mounting brackets 219, which are connected to the secondary tailgate 217, so as to guide the secondary tailgate 217 between extended and retracted positions. In this regard, the tracks 225 may be translatably attached (for example, slidably attached) to mounting brackets 219. A number of tracks 225 used may match a number of mounting brackets 219 used.

As shown in FIG. 2, the telescoping mechanism 201 may include multiple bearings 227, for example, four bearings 227 located at tops and bottoms of each of two ball screws 221 and the housings of which are attached to the primary tailgate 216. The telescoping mechanism 201 may, however, include a different number of bearings 227 to support ball screws 211 depending upon the configuration.

As shown in FIG. 2, the telescoping mechanism 201 may include one or more motors 229 for driving a drive shaft 233 that drives gear boxes 231 that drive ball screws 221. In FIG. 2, one motor 229 is shown positioned below the secondary tailgate 217 and positioned between the secondary tailgate 217 and the left side of the vehicle (not shown). Alternatively, or in addition, a motor 229 may be positioned between the secondary tailgate 217 and the right side of the vehicle (not shown). Control electronics 226 including a switch 226a, may be provided in the tailgate 213 to control the motor(s) 229. Electrical power may be provided to the control electronics 226 and the motor 229 via power cables 228, for example, one of which may pass though or near the hinge 215.

As shown in FIG. 2, the telescoping mechanism 201 may include two gearboxes 231. Depending upon the configuration, the telescoping mechanism 201 may include a different number of gearboxes 231, for example, additional gear boxes. In some embodiments, a number of the gearboxes 231 may be equal to the number of ball screws 221. In some other embodiments, a number of the gearboxes 231 may be equal to the number of ball nuts 223.

In various embodiments the telescoping mechanism 201 may include a drive shaft 233 that is connected to the gearboxes 231 for driving the ball screws 221. Depending on the configuration, the telescoping mechanism 201 may include a different number of drive shafts 233, for example, two drive shafts 233, each connected to a respective motor 229, gear box 231, and ball screw 221. As shown in FIG. 2, drive shaft 233 may be located below the secondary tailgate 217.

Referring to FIG. 2, in various embodiments the telescoping mechanism 201 may include two mounting brackets 219, two ball screws 221, two ball nuts 223, two seals 225, four bearings 227, one motor 229, two gearboxes 231, and one drive shaft 233. In such embodiments, each ball screw 221 is assembled with one ball nut 223, and each ball screw 221 is rotatably connected to two bearings 227 on the distant ends of the ball screw 221. In such embodiments, one end of a ball screw 221 and one of the bearings 227 associated with the ball screw 221 are located proximate to one of the gearboxes 231 and proximate to the drive shaft 233, while the end of that ball screw 221 and the other bearing 227 associated with this ball screw are located distant from one of the gearboxes 231 and distant from the drive shaft 233. In such embodiments, the telescoping mechanism 201 may include two mounting brackets 219 attached to the secondary tailgate 217—at the opposing sides of the secondary tailgate 217—and each of the two mounting brackets 219 may be attached to its own ball nut 223. In such embodiments, each of the gearboxes 231 may be attached to its own ball screw 221. In such embodiments, each of the two sealed tracks 225 may be located on opposing sides of the secondary tailgate 217 and each sealed track 225 may be fixed to its own gate mount 219.

Operation of the illustrative telescoping mechanism 201 will now be described. The tailgate 213 may be moved from a closed, upright position to an open, horizontal position by operating a release lever 214 or other suitable mechanism associated with a latching mechanism (not shown), so that the tailgate 213 may rotate via the hinges 215 that rotatably attach the tailgate 213 to support panels at the bed walls of the bed. Actuation of the secondary tailgate 217 may be controlled with a suitable control electronics 226 including an electrical switch 226a that supplies power to run the motor 229 clockwise or counterclockwise to affect the desired actuation. Limit switches may be provided in the primary tailgate 216 so that the motor 229 may automatically turn off when the secondary tailgate 217 reaches a fully retracted position or a fully extended position. The control electronics 226/switch 226a may be operated to adjust the position of the secondary tailgate 217 at any desired intermediate position. When the secondary tailgate 217 is in its extended position, the secondary tailgate 217, mounting brackets 219, and ball nuts 223 are all located distant from the gearboxes 231 and from the drive shaft 233. If it is desired to move the secondary tailgate 217 from its extended position (or from a position between extended and retracted positions) toward its retracted position, then the motor 229 is actuated with an electrical switch. The motor 229 rotates the drive shaft 233, which actuates both gearboxes 231. Each of the gearboxes 231 rotates its own ball screw 221. Since both gearboxes 231 are actuated, then both ball screws 221 start rotating. Direction of rotation of the drive shaft 233 is such that the resulting rotation of the ball screws 221 causes the ball nuts 223 to move away from the distal end of the ball screws 221 toward proximate ends of the ball screws 221. Since the ball nuts 223 are attached to the mounting brackets 219, the mounting brackets 219 also move from the position distant from the gearboxes 231 and the drive shaft 233 along tracks 225 toward the position proximate to the gearboxes 231 and the drive shaft 233. Since the mounting brackets 219 are attached to the secondary tailgate 217, the movement of the mounting brackets 219 causes the secondary tailgate 217 to move from the position distant from the gearboxes 231 and the drive shaft 233 toward the position proximate to the gearboxes 231 and the drive shaft 233. This retracts the secondary tailgate 217. When the secondary tailgate 217 reaches the desired position, motor actuation is stopped, which stops the movement of the secondary tailgate 217.

When the secondary tailgate 217 is in a retracted position, the secondary tailgate 217, mounting brackets 219, and ball nuts 223 are all located proximate to the gearboxes 231 and from the drive shaft 233. If it is desired to move the secondary tailgate 217 from a retracted position (or from an intermediate position between extended and retracted positions) toward the extended position, then the motor 229 is actuated with the control electronics 226/switch 226a. The motor 229 rotates the drive shaft 233, which actuates both gearboxes 231. Each of the gearboxes 231 rotates its own ball screw 221. Since both gearboxes 231 are actuated, then both ball screws 221 start rotating. Direction of rotation of the drive shaft 233 is such that the resulting rotation of the ball screws 221 causes the ball nuts 223 to move away from the proximate ends of the ball screws 221 toward distal ends of the ball screws 221. Since the ball nuts 223 are attached to the mounting brackets 219, the mounting brackets 219 also move from the position proximate to the gearboxes 231 and the drive shaft 233 toward the position distal from the gearboxes 231 and the drive shaft 233. Since the mounting brackets 219 are attached to the secondary tailgate 217, the movement of the mounting brackets 219 causes the secondary tailgate 217 to move from the position proximate to the gearboxes 231 and the drive shaft 233 toward the position distant from the gearboxes 231 and the drive shaft 233. This extends the secondary tailgate 217. When the secondary tailgate reaches the desired position, motor actuation is stopped, for example, via any suitable limit switch, which stops the movement of the secondary tailgate 217.

While FIG. 2 illustrates an illustrative telescoping mechanism 201 that extends and retracts the secondary tailgate 217 via the ball screws 221 that the drive ball nuts 223, which are attached to the mounting brackets 219 connected to the secondary tailgate 217, it will be appreciated that other telescoping mechanisms may be used instead. For example, a scissor mechanism such as in a scissor jack may be used wherein a bottom portion of a secondary tailgate may be attached to an upper portion of a scissor mechanism, and wherein a lower portion of the scissor mechanism is attached to the primary tailgate. In such a configuration, a motor similar to motor 219 may drive a scissor screw in order to extend or retract the scissor structure to extend or retract the secondary tailgate. In another example, a cable and pulley mechanism may be used to extend or retract the secondary tailgate. In such embodiments, mounting brackets similar to mounting brackets 219 attached to secondary tailgate 217 may be connected at the tops and bottoms thereof to cables that ride pulleys positioned and upper and lower ends of tracks similar to tracks 225, wherein the cables are wrapped around drive pulleys driven by motor(s) similar to motor(s) 229, such that one end of the cable pulls the secondary tailgate in one direction to extend and another end of the cable pulls the secondary tailgate in the opposite direction to retract, depending on the rotation of the motor.

An input device for actuating the secondary tailgate 217 may be inside or outside the vehicle, for example, a switch on the vehicle dashboard, a switch on the tailgate 213, voice command functionality, a button on a key fob, a graphical user interface button provided by an application of a wireless device such as a smart phone, or any suitable electrical input that triggers control electronics 226 to activate switch 226a that controls the motor 229. Combinations of the foregoing may be utilized. For example, the input device may issue a command that communicates with control electronics 226 wirelessly (for example, via a smartphone as the input device though voice command or manipulation of a graphical user interface) to activate the switch 226a to control the motor 229 to extend or retract the secondary tailgate 217.

Various materials may be utilized for the tailgate 213 including the main tailgate 216 and the secondary tailgate 217 such as steel, magnesium alloy, aluminum alloy, fiber composite materials, or other suitable material of sufficient strength and durability to withstand typical wear and tear expected of a truck bed and tailgate and to be load-bearing to support the weight of cargo and/or an adult human passenger/user. For example, the main tailgate 216 may be configured to support at least several hundred pounds, for example, 500 pounds or more. The secondary tailgate 217 and its associated telescoping mechanism may be configured to be loadbearing, for example, to support at least 100 pounds or more applied at the top surface or at a side surface of the secondary tailgate 217 without damage to the secondary tailgate 217. Bearings, shafts, mounting bracket, gears of gear boxes, ball screws, ball nuts, etc., may be made of suitable high-strength materials such as hardened steel alloys or other suitable materials.

The telescoping tailgate 213 provides a unique and desirable access point to the storage bin while maintaining the traditional hinging function of a standard tailgate. It may actuate when the tailgate 213 is in either the up (closed) position or the open (down) position to provide bed access.

Generally, the secondary tailgate 117, 217 may be configured to retract downward from a top portion of tailgate 113, 213 (for example, downward from top portion 113d labeled in FIG. 1C). However, in an example, the secondary tailgate may be configured to retract upward from a bottom portion of the tailgate 113 (for example, upward from bottom portion 113c labeled in FIG. 1C), in which case the corresponding "opening" in the primary tailgate 116, 216 would be positioned at a lower portion of the tailgate 113, 213. In such a case, retracting the secondary tailgate 117, 217 may expose an opening in the lower half of the primary tailgate 116, 216 at the base of the cargo bed 111 to provide an opening through which long items may be placed into the cargo bed 111. In addition, the secondary tailgate 117, 217 may then be extended to "close" and clamp down on such items to hold the items in place. In another example, the secondary tailgate 117, 217 may be configured to retract and extend sideways (i.e., laterally left-to-right, and vice versa) to expose an opening, for example, in a center region of the primary tailgate 116, 216. A telescoping mechanism such as illustrated in FIG. 2 may be utilized for any of these configurations, and in the case of a sideways-opening configuration, the primary tailgate 116, 216 may including structural portions surround the opening on four sides to accommodate and support ball screws 221. Alternatively, a scissor mechanism, such as previously described above, may also be used to extend and retract the secondary tailgate 117, 217 in any of these upward-downward or sideways opening configurations.

Figure 3:
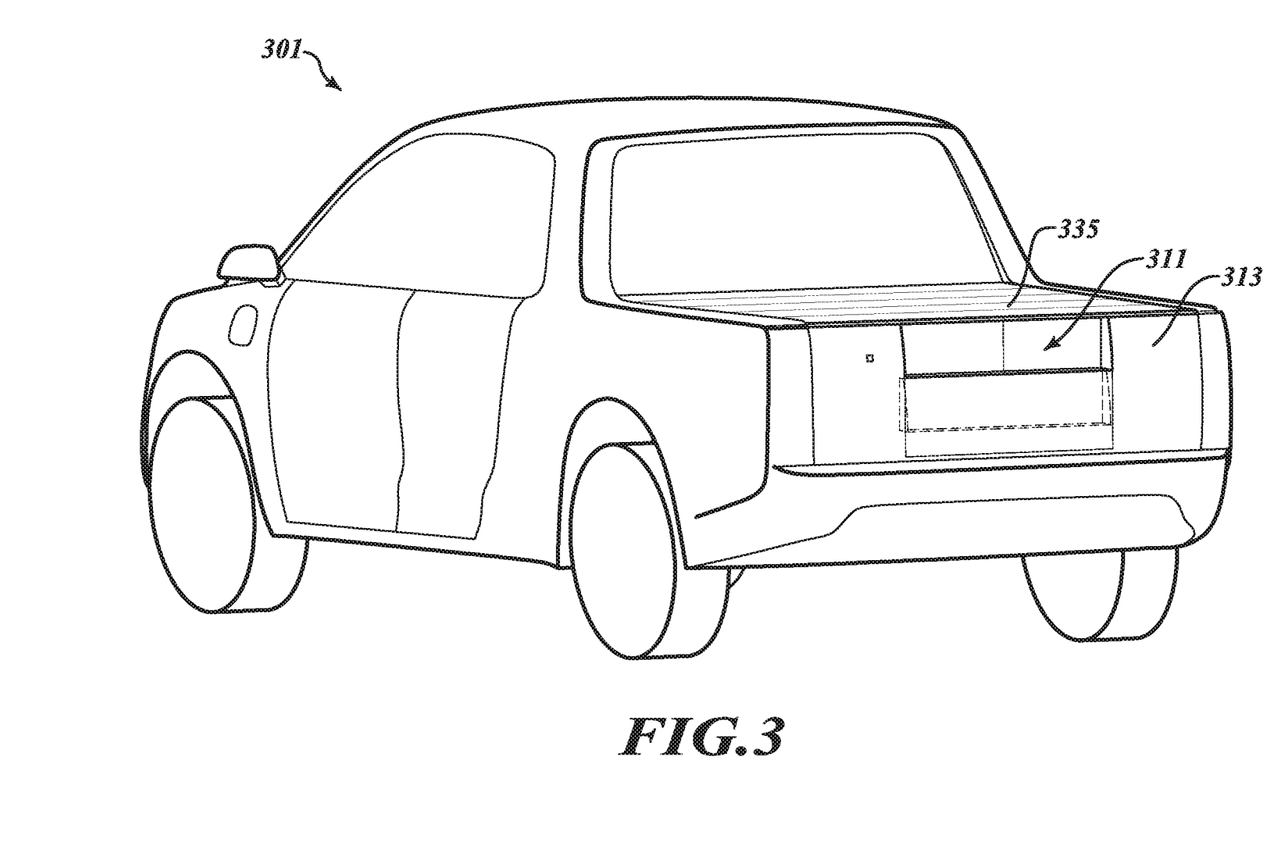
FIG. 3 is a perspective view of an illustrative vehicle with a bed cover and a telescoping tailgate in an open position.

FIG. 3 shows an illustrative telescoping tailgate according to various embodiments in which a bed 311 of a vehicle 301 has a bed cover 335. In this embodiment, a secondary tailgate can retract and provide access into a bed 311 via an opening in the primary tailgate 313. Features that provide additional functionality, for example, tie-down hooks, can also be integrated into either or both of the primary tailgate 313 and the secondary tailgate to permit items to be secured across the opening in the primary tailgate.

From the foregoing, it will be appreciated that various disclosed embodiments may help contribute to allowing easy access to the bed and bed storage once the secondary tailgate is retracted. It will also be appreciated that, in various embodiments, retraction may work in a tailgate-open position and a tailgate-closed position, thereby helping contribute to providing a reach-over capability to a user. Because the secondary tailgate can collapse fully into the primary tailgate, it may not potentially completely cover a license plate or hit a trailer hitch. It will also be appreciated from the foregoing that, in various embodiments, the entire system may be contained within the primary tailgate and that the secondary tailgate may be substantially sealed (similar to a door or window).

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. It should also be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated. In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

While the disclosed subject matter has been described in terms of illustrative embodiments, it will be understood by those skilled in the art that various modifications can be made thereto without departing from the scope of the claimed subject matter as set forth in the claims.

What is claimed is:

1. A telescoping tailgate system for an automotive vehicle, the telescoping tailgate system comprising:
    a primary tailgate configured to be movably attached to a body of an automotive vehicle, the primary tailgate defining an opening therethrough;
    a secondary tailgate movably attached to the primary tailgate; and
    a telescoping mechanism configured to move the secondary tailgate between a retracted position and an extended position, the secondary tailgate being configured to close the opening in the primary tailgate when the secondary tailgate is in the extended position;
    wherein the telescoping mechanism comprises a gearbox coupled to a ball screw disposed on each side of the secondary tailgate and a drive shaft coupled between the gearboxes, wherein the drive shaft is rotatably driven by a common motor and rotates the ball screws in unison.

2. The telescoping tailgate system of claim 1, wherein the telescoping mechanism further comprises:
    a plurality of mounting brackets fixed to the secondary tailgate;
    a plurality of seals between the secondary tailgate and the primary tailgate;
    a plurality of tracks that guide the motion of the secondary tailgate; and
    a plurality of ball nuts, each of the ball nuts fixed to one of the plurality of mounting brackets;
    wherein each of the ball screws is rotatable connected to one of the plurality of the ball nuts.

3. The telescoping tailgate system of claim 2, wherein each gearbox is configured to translate a rotation of the drive shaft into a rotation of one of the ball screws.

4. The telescoping tailgate system of claim 3, wherein a rotation of the drive shaft in one direction causes the plurality of ball nuts to move away from the drive shaft and a rotation of the drive shaft in the opposite direction causes the plurality of ball nuts to move toward the drive shaft.

5. The telescoping tailgate system of claim 4, wherein a movement of the plurality of ball nuts toward the drive shaft causes the secondary tailgate to retract and a movement of the plurality of ball nuts away from the drive shaft causes the secondary tailgate to extend.

6. The telescoping tailgate system of claim 5, wherein each of the plurality of ball screws is supported by two bearings.

7. The telescoping tailgate system of claim 1, wherein the secondary tailgate includes a metallic alloy.

8. The telescoping tailgate system of claim 1, wherein the motor is actuatable by control electronics in response to a command sent wirelessly from a wireless device.

9. The telescoping tailgate system of claim 1, wherein the secondary tailgate is positioned inside the primary tailgate when retracted.

10. An automotive vehicle with a telescoping tailgate system for carrying at least one of cargo and passengers, the automotive vehicle comprising:
    a vehicle body;
    a primary tailgate movably attached to the vehicle body, the primary tailgate defining an opening therethrough;
    a secondary tailgate movably attached to the primary tailgate; and
    a telescoping mechanism configured to move the secondary tailgate between a retracted position and an extended position, the secondary tailgate being configured to close the opening in the primary tailgate when the secondary tailgate is in the extended position;
    wherein the telescoping mechanism comprises a gearbox coupled to a ball screw disposed on each side of the secondary tailgate and a drive shaft coupled between the gearboxes, wherein the drive shaft is rotatably driven by a common motor and rotates the ball screws in unison.

11. The vehicle of claim 10, wherein the telescoping mechanism further comprises:
    a plurality of mounting brackets fixed to the secondary tailgate;
    a plurality of seals between the secondary tailgate and the primary tailgate;
    a plurality of tracks that guide the motion of the secondary tailgate; and a plurality of ball nuts, each of the ball nuts fixed to one of the plurality of mounting brackets;

wherein each of the ball screws is rotatable connected to one of the plurality of the ball nuts.

12. The vehicle of claim 11, wherein each gearbox is configured to translate a rotation of the drive shaft into a rotation of one of the ball screws.

13. The vehicle of claim 12, wherein a rotation of the drive shaft in one direction causes the plurality of ball nuts to move away from the drive shaft and a rotation of the drive shaft in the opposite direction causes the plurality of ball nuts to move toward the drive shaft.

14. The vehicle of claim 13, wherein a movement of the plurality of ball nuts toward the drive shaft causes the secondary tailgate to open and a movement of the plurality of ball nuts away from the drive shaft causes the secondary tailgate to close.

15. The vehicle of claim 14, wherein each of the plurality of ball screws is supported by two bearings.

16. The vehicle of claim 10, wherein the secondary tailgate includes a metallic alloy.

17. The vehicle of claim 10, wherein the motor is actuatable by control electronics in response to a command sent wirelessly from a wireless device.

18. The vehicle of claim 10, wherein the secondary tailgate is positioned inside the primary tailgate when retracted.

* * * * *